United States Patent

Miyanaga et al.

[11] Patent Number: 5,254,204
[45] Date of Patent: Oct. 19, 1993

[54] BEAD LOCKING APPARATUS FOR TIRE BUILDING MACHINE

[75] Inventors: Yoshinobu Miyanaga, Hyogo; Takaaki Okuda, Fukushima, both of Japan

[73] Assignee: Sumitomo Rubber Industries Limited, Kobe, Japan

[21] Appl. No.: 776,414

[22] PCT Filed: Mar. 28, 1991

[86] PCT No.: PCT/JP91/00407
§ 371 Date: Jan. 6, 1992
§ 102(e) Date: Jan. 6, 1992

[87] PCT Pub. No.: WO91/15360
PCT Pub. Date: Oct. 17, 1991

[30] Foreign Application Priority Data
Mar. 30, 1990 [JP] Japan ............... 2-34881[U]

[51] Int. Cl.⁵ .............................................. B29D 30/26
[52] U.S. Cl. ....................................... 156/401; 156/415
[58] Field of Search ............... 156/132, 133, 398, 400, 156/401, 414, 415

[56] References Cited

U.S. PATENT DOCUMENTS

| | | | |
|---|---|---|---|
| 3,101,289 | 8/1963 | Giletta | 156/401 |
| 4,131,500 | 12/1978 | Wilde et al. | 156/131 |
| 4,325,764 | 4/1982 | Appleby et al. | 156/132 |
| 4,683,021 | 7/1987 | Stalter | 156/401 |
| 4,812,197 | 3/1989 | Wright | 156/415 |

FOREIGN PATENT DOCUMENTS

| | | |
|---|---|---|
| 114554 | 9/1980 | Japan . |
| 158953 | 12/1980 | Japan . |
| 135238 | 7/1985 | Japan . |

Primary Examiner—Michael W. Ball
Assistant Examiner—Richard Crispino

[57] ABSTRACT

A bead locking apparatus for a tire building machine comprises a slider (1) in a form of an axially reciprocable sleeve disposed on a shaft (Fs) of a tire building machine. A plurality of bead locking segments (2) are circumferentially arranged on an outer surface of the slider (1), and the slider (1) has a tapered surface (3) on its outer face. The bead locking segments (2) each have an inclined inner surface (21) on which inner surface (21) the bead locking segment (7) slides on the slider tapered surface (3) to change its radial position according to reciprocation of the slider (1).

7 Claims, 3 Drawing Sheets

BEAD LOCKING APPARATUS FOR TIRE BUILDING MACHINE

TECHNICAL FIELD

This invention relates to a bead locking apparatus for a tire building machine.

BACKGROUND ART

Conventionally a green tire is a toroidal assembled but non-cured tire which has been manufactured by assembling on a cylindrical tire cover on a tire building machine. The machine comprises a drum which is supported rotatably on a shaft and the diameter of the building drum can be increased and decreased to allow the tire beads to be held locked or unlocked.

In a known conventional tire building machine there is a slider which is axially reciprocable mounted on the shaft and a plurality of bead locking segments are circumferentially arranged on the outer surface of the slider. The slider and the bead lock segments are operatively connected by a mechanism by which each segment is radially displaced by axial reciprocation of the slider. However, in this type of transmission system, the link mechanism is structurally sturdy when the link is parallel to the pressure acting direction, but structurally weak when the link is skewed to the pressure acting direction.

As a result, the range of stop positions which can successfully be provided for each segment is limited and therefore it is not possible to lock beads with a very wide range of diameters. This limits the flexibility of the machine in relation to different tire sizes.

DISCLOSURE OF THE INVENTION

An object of the invention is to provide a bead locking apparatus for a tire building machine which allows locking of various diameter beads with the same power or effectiveness.

According to one aspect of the present invention a bead locking apparatus for a tire building machine comprises a slider in a form of an axially reciprocable sleeve disposed on a shaft of a tire building machine, a plurality of bead locking segments circumferentially arranged on an outer tapered surface of the slider, the bead locking segments each having an inclined inner surface, with which inner surface the bead locking segment slides on the slider tapered surface to cause a change in its radial position according to movement of the slider.

Accordingly if, for example, the slider is axially moved by a certain force provided by a cylinder device each segment is displaced radially outwardly to make an expansion. The slider may preferably be contracted by means of the contraction force of a rubber band which is set around the segments.

As a result of this mechanism, each segment slides on the slider tapered surface which it contacts by its inclined inner surface, and hence the segments change in radial height steplessly. Also the different height portions can be held positively and all portions have the same degree of support.

The radial position of each segment is determined by the axial position at which the slider is stopped which means that a change of the slider axial position caused by air pressure to the cylinder effects a change of the bead locking diameter, and this changed position is locked effectively. Thus with a fixed power in the cylinder, the work of locking various bead rings is permitted without restriction and thus providing stopless positioning.

Further, the segments move on the tapered slider surface, the contact being by the segment inner surface, and thus effective bead locking can be carried out by a fixed, unchangeable power supply irrespective of the positioning of the segments provided that the stroke of the locking diameter can match the bead diameter concerned.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF INVENTION

Figure 1:
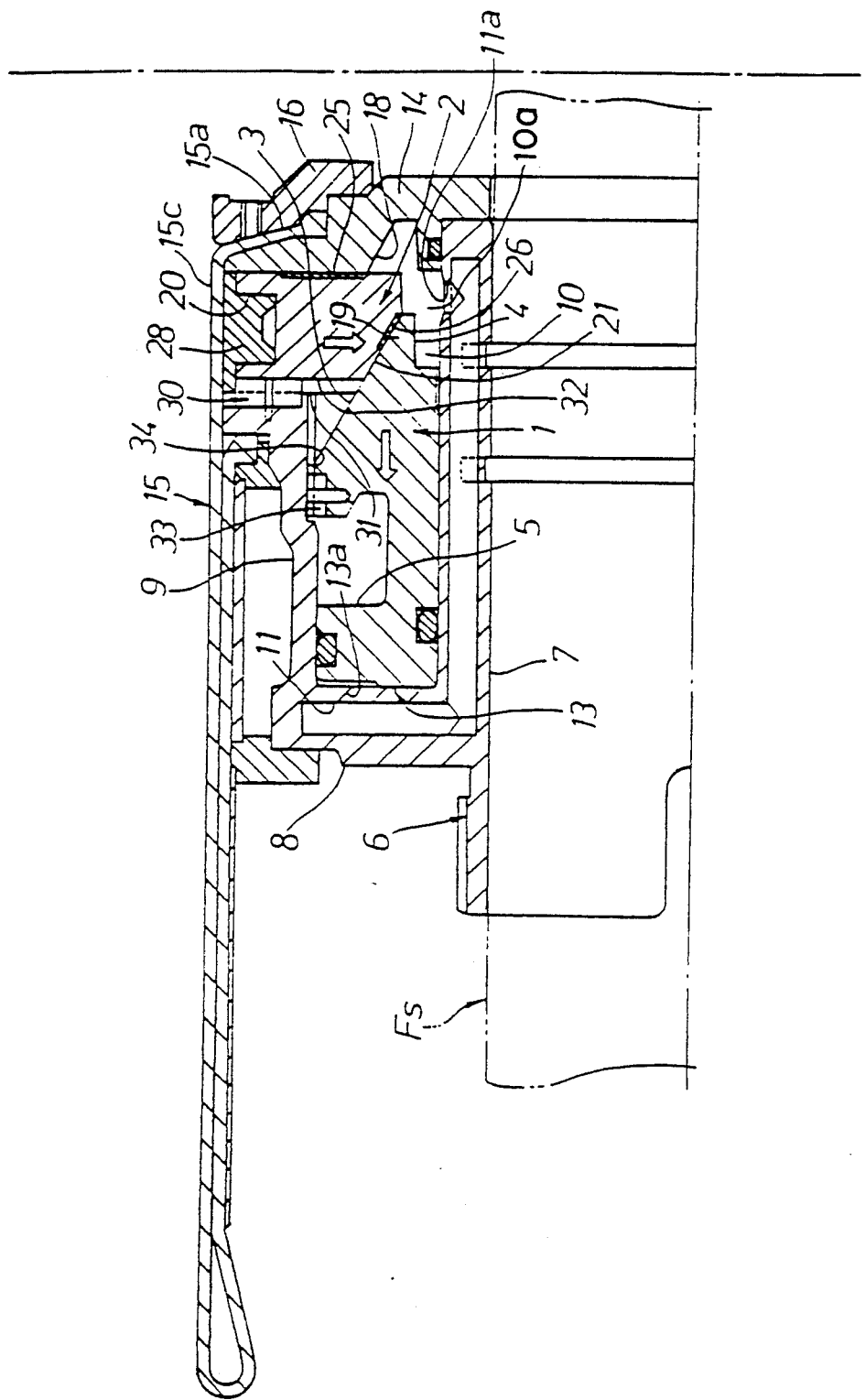
FIG. 1 is a cross sectional view from the side showing an opening 11a and showing the contracted diameter.

The invention will be described with reference to the drawings. In FIG. 1 the machine has an axially reciprocable slider 1 in the form of a sleeve over a shaft Fs. A plurality of bead lock segments 2 are circumferentially arranged around an outer surface of the slider 1, wherein reciprocation of the slider 1 causes each segment 2 to be radially displaced and hence to provide as an assembly a tire component locating surface which can be expanded or contracted diametrally.

Figure 2:
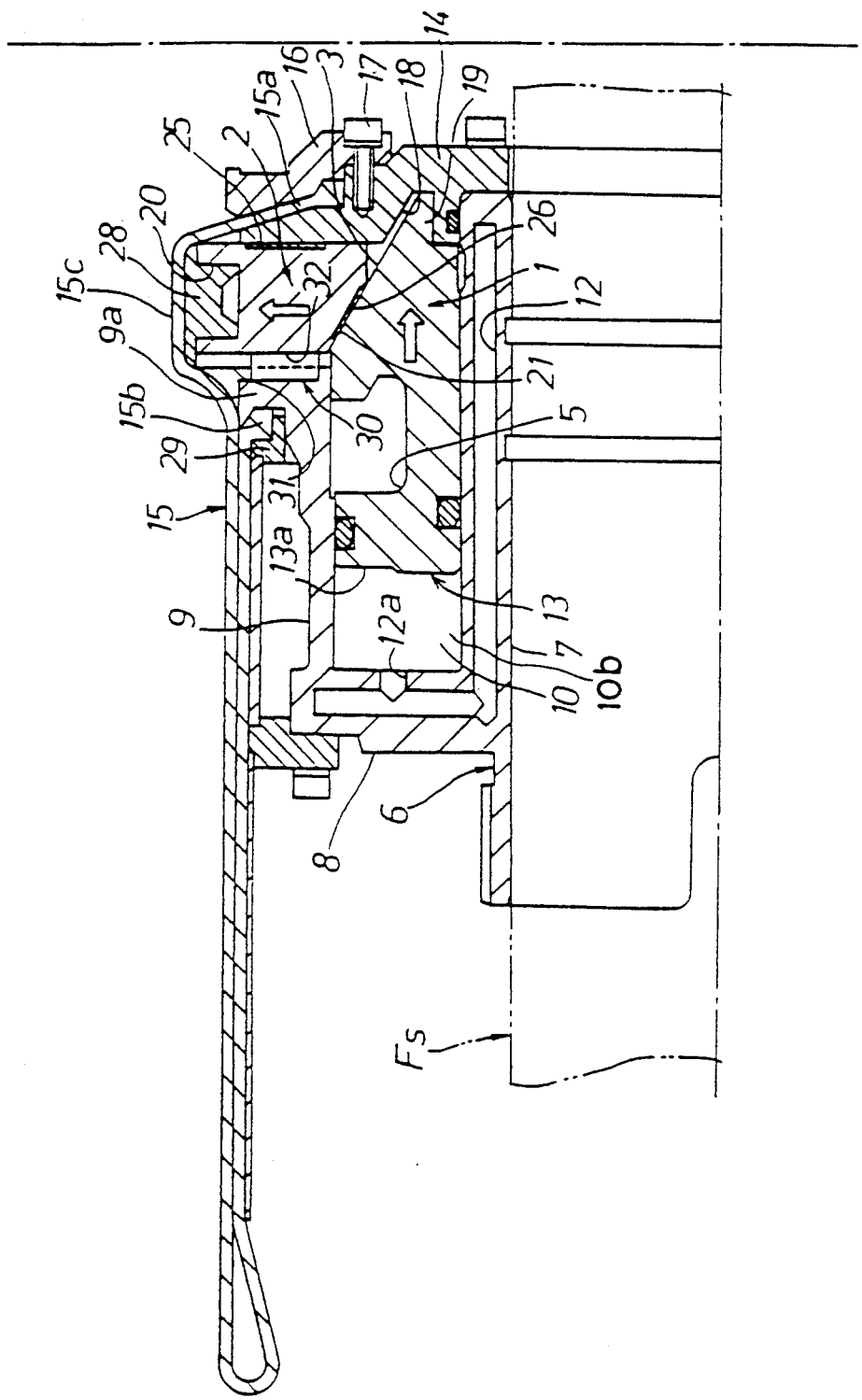
FIG. 2 shows a different cross sectional view offset from FIG. 1 showing an opening 12a and showing the expanded diameter portion.
Figure 3:
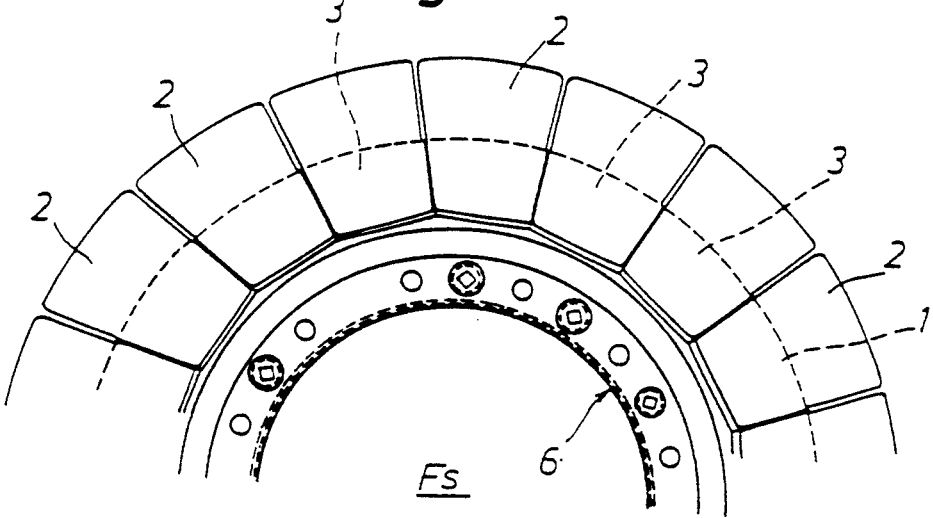
FIG. 3 is an end scrap view of the segments in the contracted state.
Figure 4:
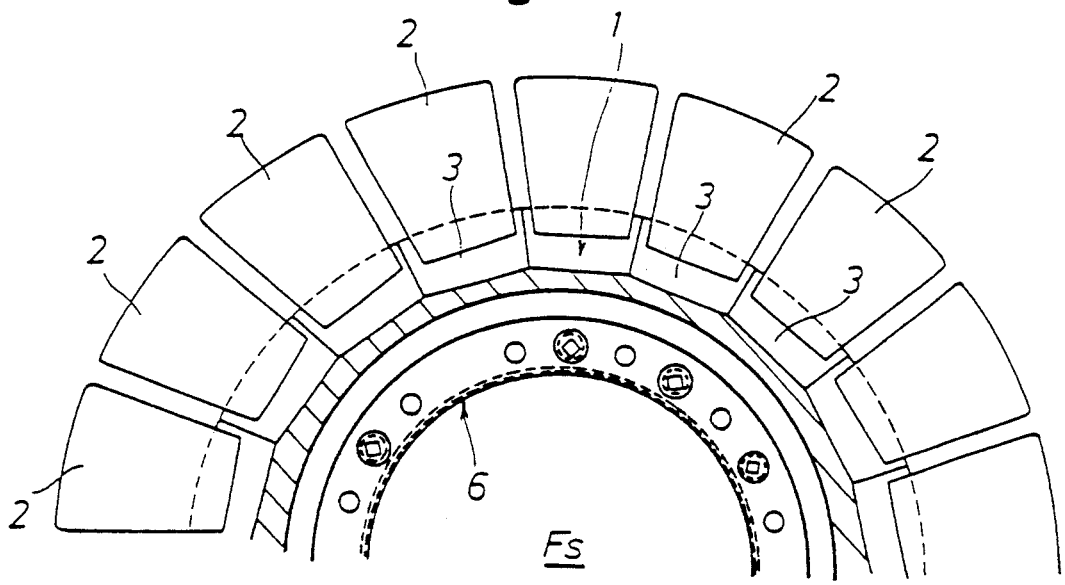
FIG. 4 is an end view of the expanded state.

The slider 1 is composed of a ring member as shown in FIGS. 3 and 4, and has a tapered surface 3 on its outer side. Specifically, tapered surface 3 is a set of such tapered surfaces 3 formed on the outer face and on the front portion of the slider 1 so as to correspond to the set of segments 2. Therefore in the drawings eighteen sections of tapered surfaces are provided around the circumference. Also as shown in FIGS. 1 and 2, the slider 1 is provided, at its inner forward portion, with a counter bore or cut-cut to provide at that end a stepped diameter 4 and on its outer face midway between its ends, with a circumferential groove 5.

The slider 1 is slidably mounted on a sleeve member 6 which is fitted around the shaft Fs. The sleeve member 6 comprises a cylinder 7, a radially projecting wall 8 which extends from the cylinder 7, and an axially projecting wall 9 extending forwards from the end of the wall 8. The annual space or piston chamber 10 which is formed by the cylinder 7, the radial wall 8 and the axial wall 9, accomodates the slider 1.

Further the sleeve member 6 is provided with fluid passages 11, 12. The passage 11 has an opening 11a at the forward end of the piston chamber 10a and the passage 12 has an opening 12a at the rearward end of the piston chamber 10b. If a fluid (e.g. air) flows in through the opening 11a, the fluid goes into a bladder 15. It is to be noted that the flow route does not move the slider 1 but if an inflow of fluid is through the opening 12a, the fluid flows into the rearward and of the piston chamber 10b and moves the slider 1 forwards as indicated in FIG. 2. To ease fluid inflow into the piston chamber 10 the base end 13 of the slide 1 has a cut 13a.

At the forward end face of the sleeve member 6, a radially extending ring 14 is attached and on this ring 14, a holder 16 for retaining one end 15a of the bladder 15 is fitted with a fastening member 17, for example, a bolt. Thus one end 15a of the bladder 15 is nipped or fastened by the ring 14 and the holder 16. The ring 14 has a side facing groove 18 on its inner face, into which the forward end 19 of the slider 1 is designed to fit and enter.

Figure 5:
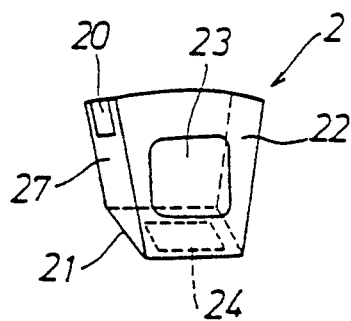
FIG. 5 is a perspective view of a segment.

Between the inner face of the ring 14 and the forward end of the axial wall 9, a bead locking segment 2 is interposed. In detail the segment 2 has a circumferential groove 20 on its outer face and an inclined inner surface 21 to co-operate with and slide on the tapered surface 3 of the slider 1. As shown in FIG. 5, on the forward face 22 and the inclined inner face 21, the segment 2 has a local recess 23, 24 in which, as shown in FIGS. 1 and 2, a slide aid 25, 26 is fitted to improve the slide action of the segments 2. In the groove 20 on the outer face of each segment 2, a rubber band 28 is fitted. This provides a band around the set of segments 2 and gives a center petal face or radial binding face. As noted above, this embodiment herein has eighteen segments 2, though, this number is not essential.

In operation, beginning with the slide 1 in the position shown in FIG. 1, (that is with the base face 13 of the slider 1 abutted to the radial wall 8), the inner surface 21 of the segment 2 is positioned at the forward end of the slider tapered surface 3. This state is, in terms of expansion/contraction action, the contracted portion shown in FIG. 3. Then, when the slider 1, resides at the portion shown in FIG. 2 (that is with the forward end of the slider 1 engaged in the groove 18 of the ring 14), the inner surfaces 21 of the segments 2 are positioned at the base portion of the slider tapered surface 3, which state is that of FIG. 4. To provide this operation, pressurised fluid is supplied through the opening 12a into the piston chamber 10 at the position shown in FIG. 1, then the slider 1 moves forward as shown by a lateral arrow in FIG. 2 and this causes the segment inner surfaces 21 to slide on the tapered surfaces 3, by which action the segments 2 are moved radially outwardly as shown by a vertical arrow in FIG. 2 so that expansion results. When the fluid pressure in the piston chamber 10 is released, the FIG. 2 state, through the opening 12a the contracting force of the rubber band 28 causes the segment inner surfaces 21 to slide on the slider tapered surfaces 3 as shown by a vertical arrow in FIG. 1 so that the segments 2 move radially inwardly and the slider 1 moves to the base portion as shown by a lateral arrow in FIG. 1. Thus, the elastic ring 28 performs the contraction of the segments 2. Also this provides protection of the bead lower portion from possible damage and relaxation of gaps between the segments 2.

Referring now to the bladder 15, the other end 15b of the bladder 15 is fastened or nipped between the forward end portion 9a of the axial wall 9 and a holder 29 attached to the same end portion 9a. Accordingly, in the contracted state as shown in FIGS. 1 and 3, a portion (this portion is called here the "segment portion 15c") of the bladder 15 which covers or contacts over the segment 2, is not expanded, but in the expanded state as shown in FIGS. 2 and 4, the segment portion 15c of the bladder 15 is expanded. Thus, the machine diameter is changed between the state of FIG. 1 and the state of FIG. 2, so that a bead ring with an apex, not shown, is placed outside the segment portion 15c. Therein, radial movement of the segments 2 is guided by a guide member 30. The guide member 30 is composed of a rod which is secured to the forward end 9a of the axial wall 9 and engageable in the radial groove 32 formed on the base side face 31 of the segment 2. Further, axial movement of the slider 1 is guided by another guide member 33. The guide member 33 is attached to the slider 1 and engaged in an axial groove 34 formed in the axial wall 9.

In shaping/building a tire with use of this type of tire building machine, materials for forming the carcass are wrapped onto the drum to form a cylindrical carcass and then the bead rings each with an apex are positioned on the segment portions 15c as noted above. The slider 1 is then axially moved to adjust the diameter at the segment portion 15c so as to match the bead ring and hold it.

In the bead locking apparatus of the present invention, the slider 1, the segments 2, the sleeve member 8, the ring 14 and the holder 16 and other components are unitised and integrally mounted on the shaft Fs, which assembly offers a convenience in that the apparatus may be changed as a unit when a change in tire size requires it.

The invention is not limited to the embodiments as noted above and modifications or design changes within the scope of the tenor of the present invention are included. For example, the inclination angle and length of the tapered surface 3 are a matter of design choice, and in correspondence thereto, the inclination angle and length of the inclined inner surface 21 is also the same. Further, in the disclosed embodiment, the tapered surface 3 of the slider 1 is designed to have an inclination to match with the inclination of the inner surface 21 of the segments 2, but such modification is obvious as to form a tapering on the forward end of the slider 1 into a cone shape. Further, the number of the segments 2 is free, the more segments which are used, the more approximation to a true circle. Practically 10 to 36 are preferred.

The bead locking apparatus of the present invention will be applied to manufacture of tires.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A bead locking apparatus for a tire building machine comprising:

a sleeve member mounted on a shaft of a tire building machine the sleeve member having a cylinder adjacent to the shaft, a rear wall standing radially outwardly of the cylinder at a rear part thereof, an outer cylindrical wall extending forwardly from an outer end of the rear wall and a piston chamber formed from an annular space formed by the cylinder, the rear wall and the outer cylindrical wall;

a readily detachable ring standing radially outwardly of a front part of the cylinder, an annular wall standing radially outwardly at a front end of the outer cylindrical wall, the annular wall and detachable ring being generally circumferentially parallel, the annular wall having generally the same radial height as the ring and defining a circumferential internal space with the ring, a circumferential outward mouth being formed between the annular wall and the ring;

a slider mounted on the piston chamber, the slider being shaped to be formfitting to the piston chamber and being axially reciprocable between the rear wall and the ring, the slider being provided on an outer front surface with a tapering inclination which extends forwardly of the annular ring;

a plurality of bead locking segments circumferentially arranged outwardly on the tapering portion in the circumferential space between the annular wall and the ring with each segment having a bottom surface formfitting to the tapering inclination of the slider such that the segments slide as the slider moves to thereby change radial height of the segments;

an elastic ring circumferentially encircling over outer ends of the segments for providing a centripetal tension; and a bladder covering the circumferential outward mouth formed between the annular wall and the ring;

the piston chamber being divided into a front chamber and a rear chamber and an opening being provided on the rear wall for supplying a fluid into the rear chamber and an opening being provided on a front end of the cylinder for supplying a fluid into the front chamber, wherein the fluid supplied into the front chamber communicates with the bladder for expansion of the bladder.

2. The bead locking apparatus as claimed in claim 1, wherein the elastic ring generally has a T-shape with a top position and a base portion, the outer ends of the segments each having a circumferential groove and the base portion of the elastic ring being positioned in the circumferential grooves of the segments, the top portion of the elastic ring covering the outer ends of the segments.

3. The bead locking apparatus as claimed in claim 1, further comprising a holder detachably mounted on the detachable ring, an end of the bladder being mounted between the holder and the ring.

4. The bead locking apparatus as claimed in claim 3, wherein the bladder has a second end which is opposed to the end mounted between the holder and the ring, the bead locking apparatus further comprises an axially projecting wall extending from the rear wall, the axially projecting wall extending forward from the rear wall and being spaced from the outer cylindrical wall, the second end of the bladder being fastened to the axially projecting wall.

5. The bead locking apparatus as claimed in claim 1, further comprising an axially projecting wall extending from the rear wall, the axially projecting wall extending forward from the rear wall and being spaced from the outer cylindrical wall.

6. The bead locking apparatus as claimed in claim 5, further comprising a plurality of guide members secured to a forward end of the axially projecting wall, each of the bead locking segments being slidably secured to guide members for radial displacement thereof, the bead locking apparatus further comprising a slider guide member attached to the slider and engageable in an axial groove formed in an interior of the axially projecting wall, the slider being axially reciprocable along the slider guide member, the plurality of bead locking segments being moved radially inwardly due to the contracting force of the elastic ring when the slider moves rearward.

7. The bead locking apparatus as claimed in claim 1, wherein the slider, the bead locking segments, the sleeve member and the ring are unitized and integrally mounted on the shaft of the tire building machine.

* * * * *